United States Patent
Berger et al.

(10) Patent No.: US 12,060,924 B2
(45) Date of Patent: Aug. 13, 2024

(54) DEVICE FOR WINDING/UNWINDING A LINK

(71) Applicant: Conductix Wampfler France, Belley (FR)

(72) Inventors: Jean-Michel Berger, Brens (FR); Bruno Parseihian, Magnieu (FR); Yohan Fournier, Sermerieu (FR)

(73) Assignee: Conductix Wampfler France, Belley (FR)

( * ) Notice: Subject to any disclaimer, the term of this patent is extended or adjusted under 35 U.S.C. 154(b) by 0 days.

(21) Appl. No.: 17/925,879

(22) PCT Filed: May 18, 2021

(86) PCT No.: PCT/FR2021/050866
§ 371 (c)(1),
(2) Date: Nov. 17, 2022

(87) PCT Pub. No.: WO2021/234273
PCT Pub. Date: Nov. 25, 2021

(65) Prior Publication Data
US 2023/0193981 A1    Jun. 22, 2023

(30) Foreign Application Priority Data
May 19, 2020   (FR) ...................................... 2005123

(51) Int. Cl.
*F16H 1/32* (2006.01)
*F16H 57/02* (2012.01)
*H02K 7/116* (2006.01)

(52) U.S. Cl.
CPC ............. *F16H 1/321* (2013.01); *F16H 57/02* (2013.01); *H02K 7/116* (2013.01);
(Continued)

(58) Field of Classification Search
CPC ......... F16H 2001/323; F16H 2001/324; F16H 2001/327; F16H 2057/02034; H02K 7/116
See application file for complete search history.

(56) References Cited

U.S. PATENT DOCUMENTS

| | | | |
|---|---|---|---|
| 4,103,568 A | 8/1978 | Berard et al. | |
| 4,876,471 A | 10/1989 | Lacour | |
| 10,619,706 B2 * | 4/2020 | Uehara | ..................... F16H 1/32 |

FOREIGN PATENT DOCUMENTS

| | | | | |
|---|---|---|---|---|
| CN | 1613695 A | * | 5/2005 | ............. B60R 22/28 |
| DE | 10350040 A1 | | 5/2005 | |

(Continued)

OTHER PUBLICATIONS

International Search Report for Application No. PCT/FR2021/050866, dated Aug. 19, 2021.
(Continued)

*Primary Examiner* — Huan Le
(74) *Attorney, Agent, or Firm* — Ryan T. Grace; Advent, LLP

(57) ABSTRACT

A device for winding/unwinding a link includes, but is not limited to, an input shaft and a hollow through output shaft, the two shafts being coaxial and movable in rotation about a longitudinal axis; a permanent magnet synchronous motor comprising a rotor integral in rotation with the input shaft; a cycloidal reducer comprising an eccentric cam mounted integral in rotation with the input shaft, and a cycloidal disc mounted integral in rotation with the cam, in such a way that a rotation of the cam about the longitudinal axis drives a rotation of the cycloidal disc in an eccentric and cycloidal movement; and a transmission member suitable for transmitting an angular displacement of the cycloidal disc to the output shaft.

12 Claims, 7 Drawing Sheets

(52) U.S. Cl.
CPC .. *F16H 2001/323* (2013.01); *F16H 2001/324* (2013.01); *F16H 2001/327* (2013.01); *F16H 2057/02034* (2013.01); *F16H 2057/02073* (2013.01)

(56) References Cited

FOREIGN PATENT DOCUMENTS

| | | |
|---|---|---|
| DE | 202017006777 U1 | 5/2018 |
| FR | 2335754 A1 | 7/1977 |
| FR | 2607333 A1 | 5/1988 |
| FR | 2899399 A1 | 10/2007 |
| JP | 2006300273 A | 11/2006 |
| WO | 2005046030 A1 | 5/2005 |
| WO | 2018219597 A1 | 12/2018 |

OTHER PUBLICATIONS

Preliminary Search Report for Patent Application No. FR2005123, dated Jan. 11, 2021.

\* cited by examiner

DEVICE FOR WINDING/UNWINDING A LINK

FIELD OF THE INVENTION

The present invention relates to the field of devices for winding and/or unwinding links.

PRIOR ART

Devices for winding and/or unwinding a link are used in many industrial applications. In particular, a link can have to be deployed between two elements having a relative position with respect to one another, this relative position being able to change over time.

For example, the first element can be a support fixed to the ground, a frame of a robot, etc., and the second element can be a carriage or travelling gantry on the ground, an arm of a robot, etc. The second element is able to be moved in relation to first element by a distance of about from ten metres to more than a kilometre.

The link is adapted to transfer a fluid, energy and/or signals between the two elements. The link can thus be an electric cable, an air or fluid pipe, an optical fibre or a bundle of optical fibres, etc. The link is wound around a winding support, such as a winding reel.

A winding/unwinding device, mounted on the first or the second element, is suitable for winding and/or unwinding the link on a reel. The link thus extends between the reel, located on a first side of the winding/unwinding device, and a rotating joint, opposite the first side with respect to the device.

The link winding/unwinding device can be motorised, and wind and/or unwind the link in a synchronised manner with the displacement of the second element. Thus, the device winds the link on the reel when the second element is coming closer to the first element so as to reduce its length by as much, and unwinds more length of the link when the second element is moving away from the first element.

Document FR 2 335 754 describes a link winding/unwinding device comprising a helical bevel gearbox. The gearbox comprises several bevel pinions, each one being linked to a motor coupler set, and meshing on the same bevel wheel. Such devices make it possible to mount several motor coupler sets on a common helical bevel gearbox. Thus, the torque can be adapted according to the application considered, and the motor coupler sets can be produced in a larger number, which tends to reduce the cost of production.

However, helical bevel gearboxes lack in compactness when a substantial reduction is sought. Moreover, they cannot satisfactorily withstand brief and/or substantial jolts. Indeed, only a low number of teeth of the elements of the gearbox are in contact with each other.

Other known devices for winding/unwinding a link include an asynchronous motor in direct connection with the reel, through a gearbox. However, an asynchronous motor offers only low precision in the control of the torque. There can be differences of about 15% between the setpoint torque and the torque actually provided to the output shaft by the asynchronous motor. Indeed, in an asynchronous motor, the rotor does not rotate at the same speed as the magnetic field. This generates sliding, and a magnetisation of the rotor by the motor current, therefore a loss in the rotation speed at the output of the motor and imprecisions on the current/torque relationship. Consequently, a portion of the current put into the asynchronous motor is lost and is not used to generate the torque. The difference between the setpoint torque and the torque actually provided to the output shaft is therefore substantial, which complicates the controlling of the winding/unwinding device. The asynchronous motor is therefore not entirely satisfactory when great precision in controlling the torque is required.

In addition, an asynchronous motor does not allow for overtorquing over short periods and at values as high as a synchronous motor. This can give rise to problems in generating the emergency stopping phases, or phases that require braking the reel and launching it in the opposite direction in a very short time, which is the case when the winder has to pass above its point of supply.

Finally, these asynchronous motor winding/unwinding devices do not allow for satisfactory modularity. Indeed, these devices require an electronic regulation because they are controlled by a frequency variator and a control program that modulates the torque setpoint according to the operating phase of the device. Yet, the controlling of several asynchronous motors with a single frequency variator would lead to poor results in terms of the torque obtained in relation to the setpoint. Consequently, such electronically-regulated asynchronous motor devices for winding and/or unwinding cannot include several asynchronous motors when good precision on the control of the torque is required.

The power of the asynchronous motor must therefore be modified at each application, in order to be adapted to the needs of the client. The sizing of the asynchronous motor driving the device is therefore complex to be adapted to a large diversity of applications, in particular to different types of links, installation heights, speeds and accelerations of the winding/unwinding device, etc. The torque may not always be adapted according to the need specific to the application, and the number of common parts of these devices for winding/unwinding a link is limited, which increases the cost of the device. Moreover, it is often necessary to purchase a specific motor for a given application, which further increases the costs and decreases the number of accessible applications.

Documents FR 2 607 333 A1 and FR 2 899 399 A1 describe devices for winding/unwinding a link comprising a magnetic coupler with hysteresis. These devices do not require electronic adjustment and can be modular. Indeed, the adjustment is carried out by the magnetic couplers which adapt their speed to the speed of the reel, supplying a pure torque and therefore somewhat constant traction on the link.

However, the magnetic coupling devices for winding/unwinding have a complete yield that is less, and which does not make it possible to manage transient phenomena such as the emergency stops or passing a point of supply. Moreover, these devices are not effective once a certain power is exceeded, because it is difficult to assemble an excessive number of couplers on the same gearbox, the dimensions of the latter becoming very large, and it is expensive to increase the size of the couplers.

DISCLOSURE OF THE INVENTION

A purpose of the invention is to propose a compact device for winding/unwinding a link and having a large reduction range.

Another purpose of the invention is to propose a device for winding/unwinding a link with good precision for controlling the torque and allowing for high overtorquing over short periods of time.

Another purpose of the invention is to propose a modular device for winding/unwinding a link, in such a way as to adapt the torque to the desired use while still maintaining low production costs.

Another purpose of the invention is to propose a device for winding/unwinding a link that makes it possible to protect the link to be wound/unwound.

According to a first aspect, the invention relates to a device for winding/unwinding a link, comprising:

- an input shaft movable in rotation about a longitudinal axis,
- an output shaft substantially coaxial to the input shaft, the output shaft being a hollow through shaft arranged for the passage of the link between a reel and a rotating joint, the output shaft being adapted to drive the reel in rotation about the longitudinal axis,
- at least one permanent magnet synchronous motor comprising a rotor arranged around a first portion of the output shaft, the rotor being integral in rotation with the input shaft,
- a cycloidal reducer arranged around a second portion of the output shaft, the cycloidal reducer comprising at least one internal cam, an external crown and at least one cycloidal disc arranged between each cam and the crown, wherein each cam is mounted integral in rotation with the input shaft, the at least one cycloidal disc is mounted integral in rotation with each cam, and wherein each cam is eccentric, in such a way that a rotation of each cam about the longitudinal axis drives a rotation of the at least one cycloidal disc in an eccentric and cycloidal movement, and
- a transmission member suitable for transmitting an angular displacement of the at least one cycloidal disc to the output shaft, in such a way that an eccentric and cycloidal rotation of the at least one cycloidal disc drives a rotation about the longitudinal axis of the output shaft.

Certain preferred but not limiting characteristics of the winding/unwinding device described hereinabove are as follows, taken individually or in combination:

- the input shaft is arranged around at least one portion of the output shaft;
- the winding/unwinding device further comprises a casing wherein the at least one synchronous motor and the cycloidal reducer are arranged, the output shaft passing through the casing from one end to the other of the casing;
- the winding/unwinding device comprises between one and four synchronous motors mounted in series along the first portion of the output shaft;
- the at least one synchronous motor is an axial flux permanent magnet synchronous motor;
- the at least one cam and the input shaft are formed from a single piece, each cam comprising an external face having a radial dimension that varies according to the angular position about the longitudinal axis, when each cam is mounted in the winding/unwinding device;
- the at least one cycloidal disc is a cycloidal wheel;
- the transmission member comprises a first portion and a second substantially radial portion adapted to connect the first portion with the output shaft, the transmission member being arranged in such a way that an eccentric and cycloidal rotation of the at least one cycloidal disc drives a rotation about the longitudinal axis of the first portion of the transmission member;
- the at least one cycloidal disc comprises at least one longitudinal bore, and the first portion of the transmission member forms at least one longitudinal finger suitable for extending in the at least one longitudinal bore of the at least one cycloidal disc, in such a way as to transmit the angular displacement of the at least one cycloidal disc to the first portion of the transmission member;
- the cycloidal reducer comprises two substantially identical cycloidal discs and mounted in series along the longitudinal axis, the two cycloidal discs being placed in opposite eccentricity in the cycloidal reducer, wherein each cycloidal disc comprises at least one longitudinal bore, the longitudinal bores of the two cycloidal discs being arranged facing one another in such a way as to form at least one pair of longitudinal bores when the cycloidal discs are mounted in the winding/unwinding device, the at least one finger of the transmission member extending in the at least one pair of longitudinal bores of the two cycloidal discs;
- the winding/unwinding device comprises a first cycloidal disc and a second cycloidal disc, the first cycloidal disc being mounted integral in rotation with the at least one cam, the second cycloidal disc being mounted integral in rotation with the first cycloidal disc, wherein the first portion of the transmission member comprises an internal toothing arranged outside the second cycloidal disc and adapted to cooperate with an external cycloidal toothing of the second cycloidal disc in such a way that an eccentric rotation of the second cycloidal disc drives a rotation about the longitudinal axis of the first portion of the transmission member;
- the first portion of the transmission member comprises a rigid frame and an assembly of substantially cylindrical shafts, the rigid frame comprising an assembly of substantially cylindrical bores circumferentially distributed about the longitudinal axis, wherein each shaft of the assembly of shafts is inserted into a respective bore of the assembly of bores of the frame of the first portion of the transmission member, in such a way as to form the internal toothing of the first portion of the transmission member.

According to a second aspect, the invention relates to a winder of a link, the winder comprising a reel, a winding/unwinding device according to the first aspect, a rotating joint, and a control device, wherein the control device is adapted to control a setpoint and/or control the synchronous motor, in such a way that the control device and the winding/unwinding device provide a suitable winding/unwinding torque.

DESCRIPTION OF THE FIGURES

Other characteristics, purposes and advantages of the present invention shall appear when reading the following detailed description, given as a non-limiting example, which will be illustrated by the following figures.

DETAILED DESCRIPTION OF THE INVENTION

Figure 1:
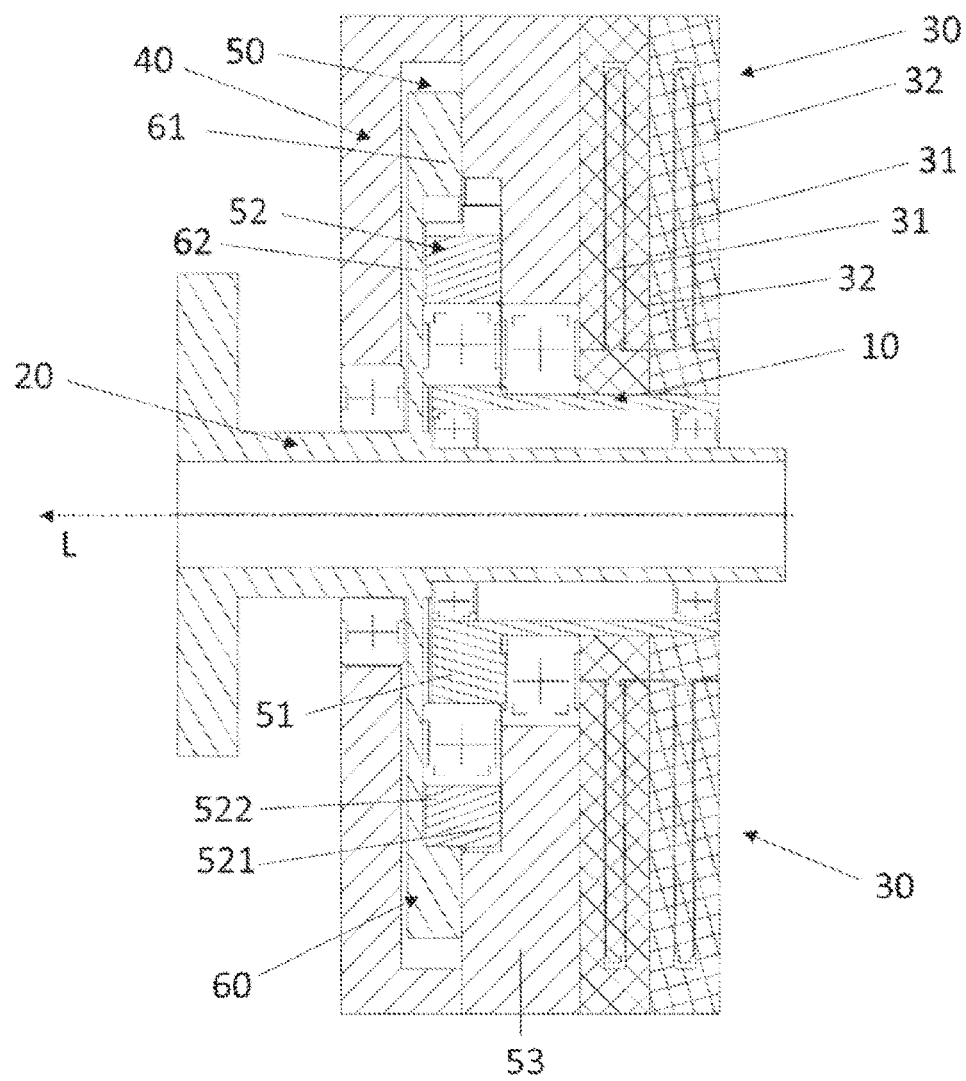
FIG. 1 shows a diagrammatical side view of a winding/unwinding device according to an embodiment of the invention.

A device for winding/unwinding a link comprises:
an input shaft 10 movable in rotation about a longitudinal axis L,
an output shaft 20 substantially coaxial to the input shaft 10, the output shaft 20 being a hollow through shaft arranged for the passage of the link between a reel and a rotating joint, the output shaft 20 being adapted to drive the reel in rotation about the longitudinal axis L.

In the rest of the application, the term longitudinal axis L means the axis about which are arranged the input shaft 10 and the output shaft 20. A radial direction is a direction perpendicular to the longitudinal axis L and passing through it. A longitudinal element is an element that extends mainly in the direction of the longitudinal axis L. A radial element is an element that extends mainly in the direction of the radial direction.

The terms internal and external, respectively, are used in reference to the radial direction in such a way that the portion or the internal face of an element is closer to the longitudinal axis L than the portion or the external face of the same element.

The terms upstream and downstream, respectively, are used in reference to a position on the longitudinal axis L. The rotating joint is placed upstream from the winding/unwinding device, and the reel is placed downstream from the winding/unwinding device.

The term link is used to designate different links such as electric cables, data cables, air or fluid pipes, etc.

The link is intended to be arranged between the reel and the rotating joint, and to be wound and/or unwound around the reel. The rotating joint makes it possible to make the connection between the reel, which is driven in rotation by the output shaft 20, and the environment of the winding/unwinding device, which does not rotate about the longitudinal axis L. The rotating joint is mounted on the output shaft 20 and integral with the output shaft 20 in rotation about the longitudinal axis in such a way that the rotating joint is driven by the output shaft 20 at the same rotation speed as the output shaft 20.

For example, in the case of the transmission of an electrical power through the bias of the link, the rotating joint can consist of a system of rings made from an alloy having good conductivity on which rub sintered brushes with a high content of conductive material, which makes it possible to ensure the continuity. The link coming from the reel is connected to the rings. A link coming from the fixed portion is connected to the brushes.

A rotation of the reel in a first direction drives a winding of the link around the reel and a rotation of the reel in a second direction opposite the first direction drives an unwinding of the link. The winding/unwinding device can operate in the first direction of rotation and in the second direction of rotation. Thus, the length of the link can be adjusted, by the bias of the rotation of the reel.

The winding/unwinding device makes it possible to protect the link, by the bias of the hollow shaft. Indeed, the link can thus extend between the reel, located on a first side of the winding/unwinding device, and a rotating joint, located at a second side, opposite the first side, of the device, in the hollow shaft of the device. The link is thus protected from potential degradations, for example dues to climatic conditions, a restrictive exterior environment, erosion by contact with the exterior, or impacts and friction with exterior elements. The winding/unwinding device also makes it possible to protect the link from internal members of the winding/unwinding device, because the link is confined in the output shaft 20, which rotates at the same speed as it does.

The device for winding/unwinding a link also comprises:
at least one permanent magnet synchronous motor 30 comprising a rotor 31 arranged around a first portion of the output shaft 20, the rotor 31 being integral in rotation with the input shaft 10,
a cycloidal reducer 50 arranged around a second portion of the output shaft 20, the cycloidal reducer 50 comprising at least one internal cam 51, an external crown 53 and at least one cycloidal disc 52 arranged between each cam 51 and the crown 53, wherein each cam 51 is mounted integral in rotation with the input shaft 10, the cycloidal disc 52 is mounted integral in rotation with each cam 51, and wherein each cam 51 is eccentric, in such a way that a rotation of each cam 51 about the longitudinal axis L drives a rotation of the at least one cycloidal disc 52 in an eccentric and cycloidal movement, and
a transmission member 60 suitable for transmitting an angular displacement of the at least one cycloidal disc 52 to the output shaft 20, in such a way that an eccentric and cycloidal rotation of the at least one cycloidal disc 52 drives a rotation about the longitudinal axis L of the output shaft 20.

The term gearbox designates a mechanism intended to reduce the speed and increase the torque, the output shaft 20 rotating at a lesser speed than that of the input shaft 10. Alternatively, the term gearbox can designate any mechanism intended for modifying the speed and the torque of the output shaft 20 in relation to the input shaft 10.

The cycloidal reducer 50 thus makes it possible to modify the speed of the output shaft 20 in relation to the speed of the drive shaft, by a certain ratio called reduction radio. The device for winding and/or unwinding the link thus transmits a rotation of the input shaft 10 to the output shaft 20. The winding/unwinding device therefore makes it possible to drive the reel in rotation, in response to a rotation of the rotor 31 of the synchronous motor or motors 30, and as such to wind/unwind the link.

The term cycloidal is used to designate a profile that substantially corresponds to a cycloid, i.e. to a trajectory of a point fixed to a circle that rolls without sliding on a generatrix. The profiles described can move away from the purely theoretical cycloidal profile. Typically, the cycloidal disc 52 can have an external cycloidal surface.

A cycloidal reducer 50 makes it possible to reach a substantial reduction ratio, for example up to about 1/120, for example 20, 40 or 90, in a compact manner. The cycloidal reducer 50 has low probabilities of failure, a low operating clearance, and high yield, with respect to other gearboxes such as conventional helical bevel gearboxes. The cycloidal reducer 50 has a more substantial contact ratio, therefore a number of teeth on contact that is more substantial, than a conventional helical bevel gearbox. The cycloidal reducer 50 can consequently further withstand brief and or substantial jolts.

A permanent magnet synchronous motor 30 (or synchronous motor 30) leads to improved precision in the control of the torque in relation to an asynchronous motor. Indeed, as the field is created by the permanent magnets, a synchronous motor does not result in sliding or magnetisation of the rotor 31 by the motor current. Consequently, practically all the current put into the permanent magnet synchronous motor 30 is used to generate the torque. The difference between the setpoint torque and the torque actually provided to the output shaft 20 is therefore reduced. The mechanical torque is thus the direct image of the current, which facilitates the control of the winding/unwinding device and renders it more precise.

In addition, a synchronous motor 30 allows for overtorquing over short periods of time and at higher values than an asynchronous motor. The emergency stop phases are therefore better managed. The same applies for phases that require braking the reel and to relaunch it in the opposite direction in a very short time, which is the case when the winder has to pass above its point of supply. Thus, using a synchronous motor makes it possible to limit the power of the motor for the same application.

Finally, the link winding/unwinding device allows for great modularity. Indeed, several synchronous motors 30 can be controlled with the same frequency variator in such a way as to carry out the electronic regulation of the winding/unwinding device. Consequently, the number of synchronous motors 30 of the winding/unwinding device can be adapted. The dimensioning of the motor driving the device can therefore be easily adapted to a wide diversity of applications, in particular to different types of links, installation heights, speeds and accelerations of the winding/unwinding device, etc. Consequently, the number of common parts of the link winding/unwinding device is substantial, which decreases the cost of it.

For example, several identical or practically identical synchronous motors 30 can be mounted in series along the output shaft 20. Thus, the torque can be adapted as close as possible to the needs of the client. Moreover, a larger number of identical permanent magnet synchronous motors 30 is thus produced, which makes it possible to reduce the costs of it.

The synchronous motor 30 is disposed upstream from the cycloidal reducer 50. The input shaft 10 and the output shaft 20 extend substantially along the longitudinal axis L. The winding/unwinding device can have a radial symmetry about the longitudinal axis L.

The input shaft 10 is a hollow shaft, and can correspond to a drive shaft for the winding/unwinding device. The input shaft 10 can be arranged around at least one portion of the output shaft 20, the input shaft 10 being in a more external position than the output shaft 20. Roller bearings can be disposed between the input shaft 10 and the output shaft 20, in order to authorise a rotation of the input shaft 10 at a speed that is different from that of the output shaft 20.

The input shaft 10 can extend at the synchronous motor 30, and to the cycloidal reducer 50, in particular to the at least one cam 51 of the cycloidal reducer 50. The input shaft 10 can have a first end adapted to extend from the side of the rotating joint, and a second end opposite the first end.

The input shaft 10 receives the drive power to be transmitted of the synchronous motor or motors 30, the synchronous motor or motors creating the mechanical power to be transmitted via their rotor 31. The second end of the input shaft 10 can be radially extended by the at least one cam 51, at cycloidal reducer 50. A cam 51 can be located around the second end of the input shaft 10, the cam 51 being located at a more external position than the input shaft 10. Bearings can be disposed between the input shaft 10 and the output shaft 20 at the cam 51.

The at least one cam 51 and the input shaft 10 can be formed from a single piece. Alternatively, the cam 51 can be added and fixed on the input shaft 10 at its second end.

The input shaft 10 can have means for driving the rotor 31 of the synchronous motor 30 disposed at synchronous motor 30. For example, complementary flutes of the input shaft 10 and of the rotor 31 can make it possible to rigidly attach the input shaft 10 and the rotor 31 of the synchronous motor 30 in rotation with respect to one another.

During the winding of the link, the rotation of the rotor 31 is transmitted to the input shaft 10, the rotor 31 driving the input shaft 10 in rotation about the longitudinal axis L. The synchronous motor or motors 30 are then motors and drive the reel in rotation.

Inversely, during the unwinding of the link, the rotation of the input shaft 10 about the longitudinal axis L is transmitted to the rotor 31 of the synchronous motor or motors 30 by the means for driving of the rotor 31. The synchronous motor or motors 30 are then generators and brake the unwinding of the reel, preventing runaway of the reel.

The output shaft 20 is a hollow through shaft. The output shaft 20 can extend substantially between the rotating joint and the reel, over the entire length of the winding/unwinding device. The first portion of the output shaft 20 is disposed upstream of the second portion of the output shaft 20. The first portion and the second portion of the output shaft 20 can be surrounded by the input shaft 10. Alternatively, only the first portion of the output shaft 20 can be surrounded by the input shaft 10.

The output shaft 20 can include a third portion disposed downstream from the second portion, the third portion connecting the second portion and the end of the output shaft 20 at the reel. The transmission member 60 can be arranged between the second portion and the third portion of the output shaft 20.

The winding/unwinding device can include a casing 40 wherein the at least one synchronous motor 30 and the cycloidal reducer 50 are arranged. The output shaft 20 passes through the casing 40 from one end to the other of the casing 40. Thus, the link is never in contact with the exterior when it passes between the rotating joint and the reel, the link being still contained in the output shaft 20. The link is thus protected even better from potential degradations due to the outside environment. The link is also protected from the internal members of the winding/unwinding device.

In the case of a fluid, the output shaft 20 can be used as a conduit for transporting the fluid from one side to the other of the winding/unwinding device. Thus, it is not necessary to use an additional conduit for the transport of the fluid through the winding/unwinding device.

The output shaft 20 can have a substantially constant radius over the entire length of the output shaft 20. Alternatively, the output shaft 20 can have a variable radius according to a position along the longitudinal axis L. For example, the first portion and the second portion of the output shaft 20, at the level respectively of the synchronous motor 30 and of the cycloidal reducer 50, can have a first radius. The third portion of the output shaft 20 can have a second radius. The first radius can be less than the second radius.

The winding/unwinding device can comprise between one and ten permanent magnet synchronous motors 30, for example between one and four synchronous motors 30. The synchronous motors 30 can be mounted in series along the first portion of the output shaft 20. Thus, the synchronous motors 30 are arranged longitudinally, from upstream to downstream.

Thus, the number of permanent magnet synchronous motors 30 is adapted according to the needs of the client and the applications considered for the winding/unwinding device. In particular, a small number of synchronous motors 30, for example two synchronous motors 30 with a different power, makes it possible to cover the range of power from 1.5 to 30 kW, by adapted pitches, which is a conventional power range.

A permanent magnet synchronous motor 30 comprises a rotor 31 and a stator 32. The rotor 31 comprises an assembly of magnets arranged substantially radially about the longitudinal axis L. The stator 32 is arranged substantially radially, facing the magnets of the rotor 31.

Figure 2A:
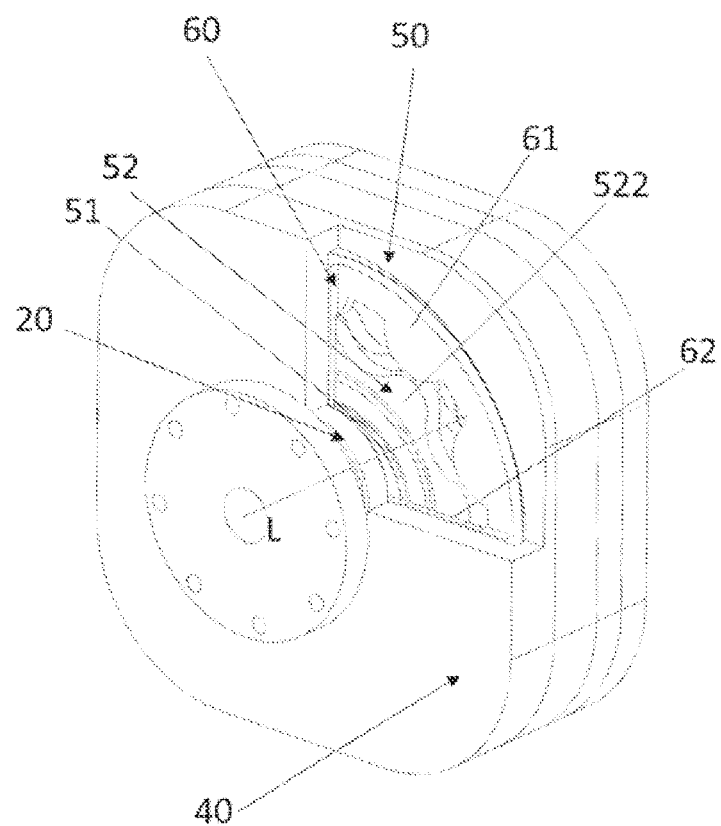
FIGS. 2a and 2b show diagrammatical perspective views as a partial cross-section of a winding/unwinding device according to an embodiment of the invention.
Figure 2B:
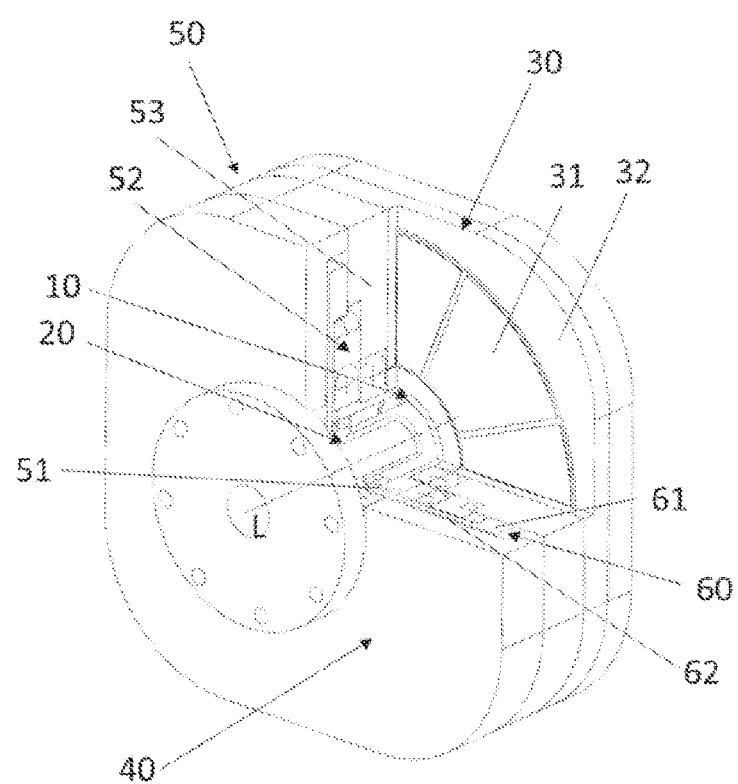

The permanent magnets can be trapezoidal magnets, having an inverted polarity between two consecutive magnets. Such trapezoidal magnets are for example shown in FIG. 2b. The windings create a magnetic flux, for example an axial flux, that alternates according to the frequency of the current passing through them. The facing magnets are then displaced to follow the rotating field, thus making it possible to create the torque.

Figure 3:
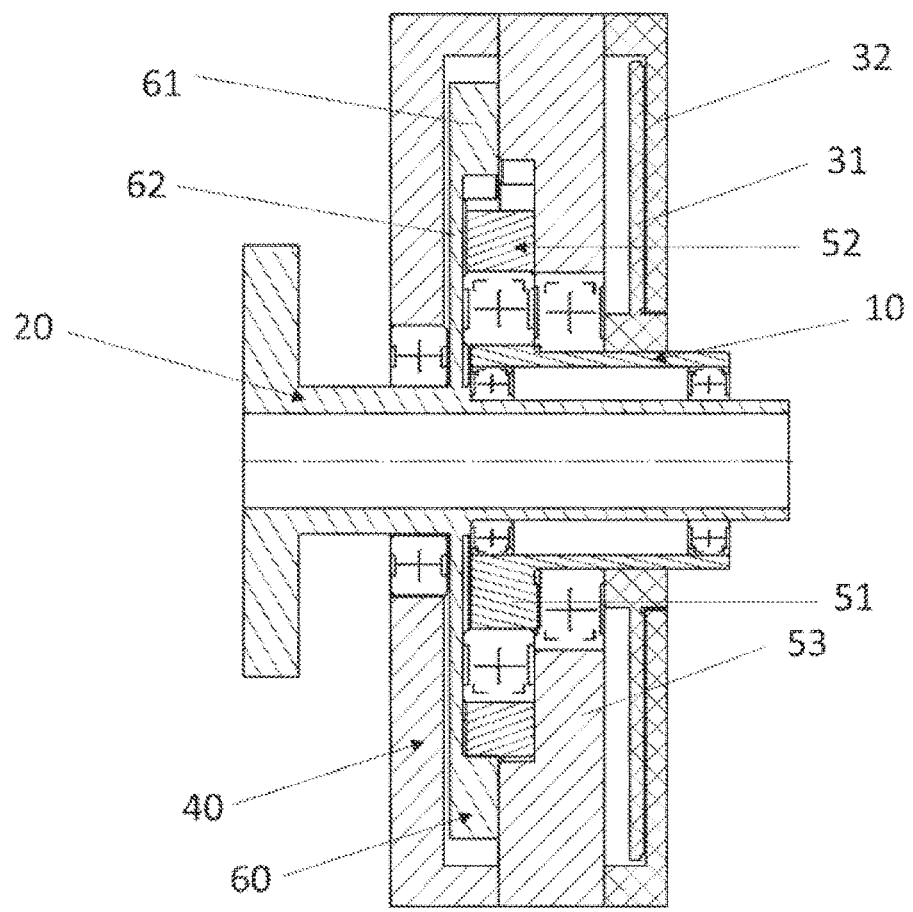
FIG. 3 shows a diagrammatical side view of a winding/unwinding device according to an embodiment of the invention.

By way of a non-limiting example, FIG. 3 shows a winding/unwinding device comprising a single permanent magnet synchronous motor 30. The permanent magnets are disposed on an upstream face of the rotor 31, and the stator 32 is arranged upstream from the rotor 31, in such a way that a downstream face of the stator 32 is arranged facing the upstream face of the rotor 31.

A winding/unwinding device can comprise two or more synchronous motors 30. Each pair of two synchronous motors 30 can then be grouped together into a motor assembly comprising a rotor 31 and a stator 32. The rotor 31 of a motor assembly comprises two assemblies of permanent magnets arranged on other side of the rotor 31. Thus one of the two assemblies of permanent magnets is arranged on an upstream face of the rotor 31, and the other of the two assemblies of permanent magnets is arranged on a downstream face of the rotor 31.

The stator 32 can be disposed on either side of the rotor 31 in such a way that each assembly of permanent magnets of the rotor 31 are facing a face of the stator 32. Advantageously, two opposite sides of the same permanent magnet can then form the rotors 31 of two contiguous motors. Alternatively, the stator 32 can be arranged between two rotors 31, the rotors 31 being arranged on either side of the stator 32, with each winding used to create the torque of two different rotors.

As a non-limiting example, FIG. 1 shows a winding/unwinding device comprising four permanent magnet synchronous motors 30. The four synchronous motors 30 are grouped together into two motor assemblies each comprising two synchronous motors 30.

The at least one permanent magnet synchronous motor 30 can be an axial flux permanent magnet synchronous motor 30. Such an axial flux synchronous motor 30 has an improved compactness in the longitudinal direction with respect to a radial flux synchronous motor.

The cycloidal reducer 50 can comprise a cam 51, or several cams 51 mounted in series along the longitudinal axis L. Each cam 51 of the device can substantially have the same cam geometry 51.

Each cam 51 can comprise an internal face and an external face. The cam 51 is eccentric. Thus, the at least one cam 51 can comprise an external face having a radial dimension that varies according to the angular position about the longitudinal axis L, i.e. according to a radial direction, when the at least one cam 51 is mounted in the winding/unwinding device. The variation in the radial dimension of the external face of the cam 51 forms the eccentricity of the cam 51.

The input shaft 10 can have a substantially constant radius along the longitudinal axis L. The radius of the input shaft 10 can be less than a radial dimension of the external face of the cam 51 regardless of the angular position about the longitudinal axis L, i.e. regardless of the radial direction. The junction between the second end of the input shaft 10 and the cam 51 therefore forms a step of a staircase. The cam 51 being eccentric, the dimension of the staircase step varies according to the angular position about the longitudinal axis L.

The internal face of the cam 51 can have a symmetry of revolution about the longitudinal axis L when the cam 51 is mounted in the winding/unwinding device. The internal face of the cam 51 can be substantially circular and centred about the longitudinal axis L, a radius of the internal face of the cam 51 corresponding substantially to a radius of the input shaft 10.

The external face of the cam 51 can have a symmetry of revolution about a cam shaft 51 when the cam 51 is mounted in the winding/unwinding device. The cam shaft 51 is parallel to the longitudinal axis L but is not confounded with the latter, the cam shaft 51 being spaced by a certain distance with respect to the longitudinal axis L.

The external face of the cam 51 can be substantially circular and centred around the cam shaft 51. In other terms, a centre of the circle of the external face of the cam 51 is placed on the cam shaft 51 when the cam 51 is mounted in the winding/unwinding device, and is therefore not placed on the longitudinal axis L.

The cycloidal reducer 50 can comprise a cycloidal disc 52, or several cycloidal discs 52 mounted in series along the longitudinal axis L. Each cycloidal disc 52 of the cycloidal reducer 50 can substantially have the same geometry, or alternatively have geometries that are different from one another.

A cycloidal disc 52 among the cycloidal disc or discs 52 of the cycloidal reducer 50 can be a cycloidal wheel. The cycloidal disc 52 comprises an internal face and an external face. The external face of the cycloidal disc 52 comprises an external cycloidal toothing. The internal face of the cycloidal disc 52 has a shape and dimensions that substantially correspond to the shape and the dimensions of the external face of the cam 51. The external face of the cam 51 drives in rotation the internal face of the cycloidal disc 52 via means of driving the cycloidal disc 52. The means of driving the cycloidal disc 52 can comprise a bearing, such as a needle or roller bearing, disposed between the cam 51 and the cycloidal disc 52. Alternatively, the means for driving the cycloidal disc 52 can comprise a smooth bearing, disposed between the cam 51 and the cycloidal disc 52.

The cycloidal disc 52 can have a symmetry of revolution about an axis of the cycloidal disc 52. When the cycloidal disc 52 is mounted in the winding/unwinding device, the axis of the cycloidal disc 52 is parallel to the longitudinal axis L but is not confounded with the latter, the axis of the cycloidal disc 52 being spaced by a certain distance with respect to the longitudinal axis L. The axis of the cycloidal disc 52 can correspond to the cam shaft 51. In particular, the internal face of the cycloidal disc 52 can be substantially circular, with a radius corresponding substantially to a radius of the external face of the cam 51.

The external cycloidal toothing of the cycloidal disc 52 can include rounded teeth, with each tooth comprising a bottom, a flank and a top. The bottom of a tooth corresponds to the most internal portion of the tooth, and the top of the tooth corresponds to the most external portion of the tooth. The flank of the tooth connects the bottom of the tooth to the top of the tooth.

The external cycloidal toothing of the cycloidal disc 52 can have a substantially cycloid profile. The generatrix of the cycloid of the cycloidal toothing can substantially correspond to a circle inscribed at the bottom of the cycloidal toothing, i.e. to a circle tangent to the bottom of each tooth of the cycloidal toothing. Alternatively, the external toothing of the cycloidal disc 52 can comprise a toothing offset in order to reinforce the toothing and increase its service life and its performance. The generatrix of the cycloid is then offset with respect to a generatrix without toothing offset.

The external toothing of the cycloidal disc 52 can alternatively have a profile that moves away from a theoretical cycloid, in such a way as to minimise the constraints that are exerted on the teeth, and to facilitate the assembly of the cycloidal meshing.

The external crown 53 of the cycloidal reducer 50 is fixed, i.e. it cannot be moved in rotation about the longitudinal axis L. The crown 53 can be a wheel having a symmetry of revolution about the longitudinal axis L. The crown 53 comprises an internal toothing on which meshes the external cycloidal toothing of the cycloidal disc 52.

The internal toothing of the crown 53 can comprise rounded teeth, with each tooth comprising a bottom, a flank and a top. The bottom of a tooth corresponds to the most external portion of the tooth, and the top of the tooth corresponds to the most internal portion of the tooth. The flank of the tooth connects the bottom of the tooth to the top of the tooth. The teeth of the crown 53 can be circumferentially distributed about the longitudinal axis L, i.e. they are disposed at an equal angular distance from one another.

Each tooth of the internal toothing of the crown 53 can have a substantially cylindrical profile. A generatrix of the cylinder of revolution extends along the longitudinal axis L, the cylinders being substantially radially distributed about the longitudinal axis L. Alternatively, each tooth of the internal toothing of the crown 53 can have any shape adapted to cooperate with the teeth of the cycloidal toothing of the cycloidal disc 52.

For example, the teeth of the crown 53 can be of substantially toroidal shape, so as to improve the contact with the cycloidal toothing of the cycloidal disc 52. Toroidal shapes of the teeth of crown 53 can be adapted for the cycloidal gearboxes 50 that have low reduction ratios. Alternatively, the internal toothing of the crown 53 can have a cycloidal shape.

The crown 53 can have a number of teeth that corresponds to a number of teeth of the cycloidal disc 52 plus one tooth. Such an offset of a single tooth makes it possible to obtain a greater reduction ratio. Thus, if the cycloidal disc 52 has n teeth, the crown 53 has n+1 teeth. At the contact zone between the cycloidal disc 52 and the crown 53, at least one top or a flank of the tooth of the cycloidal disc 52 can be in contact with at least one flank of a tooth of the crown 53. Several teeth of the cycloidal disc 52 and/or of the crown 53 can be in contact at the same time.

A radius of a circle tangent to the top of each tooth of the external cycloidal toothing of the cycloidal disc 52 can be less than a radius of a circle tangent to the bottom of each tooth of the internal toothing of the crown 53. Thus, the cycloidal disc 52 can rotate inside the fixed crown 53 by following an eccentric cycloidal movement.

In a first embodiment, the fixed crown 53 comprises a rigid frame and an assembly of shafts. The rigid frame comprises an assembly of bores circumferentially distributed about the longitudinal axis L. Each shaft of the assembly of shafts is inserted into a respective bore of the assembly of bores of the frame of the crown 53, in such a way as to form the internal toothing of the crown 53. This configuration of rigid frame and of a set of independent shafts rigidly assembled in the frame makes it possible to access high reduction ratios. Each shaft of the assembly of shafts can be substantially cylindrical and each bore of the frame of the crown 53 can be substantially cylindrical, in such a way as to result in teeth with a substantially cylindrical profile. Alternatively, each shaft and each bore can be of a substantially toroidal shape, or have any shape adapted to ensure the cooperation with the teeth of the cycloidal disc 52.

In a second embodiment, the crown 53 is formed from a single piece and comprises protrusions adapted to form the teeth of the crown 53. The protrusions can be of a substantially cylindrical, toroidal shape, or of any other shape that makes it possible to access a satisfactory contact with the cycloidal toothing of the cycloidal disc 52.

The transmission member 60 is movable in rotation about the longitudinal axis L. The transmission member 60 can include a first portion 61 and a second portion 62. The second portion 62 of the transmission member 60 can be substantially radiate and be adapted to connect the first portion 61 with the output shaft 20. The transmission member 60 can be arranged in such a way that an eccentric and cycloidal rotation of the at least one cycloidal disc 52 drives a rotation about the longitudinal axis L of the first portion 61 of the transmission member 60. Thus, the eccentric and cycloidal rotation of the cycloidal disc 52 is transformed into rotation about the longitudinal axis L by a cooperation between the cycloidal disc 52 and the first portion 61 of the transmission member 60.

The first portion 61 of the transmission member 60 can be formed from a single piece with the second portion 62 of the transmission member 60. The transmission member 60 can be formed from a piece with the output shaft 20.

An external face of the crown 53 can be mounted flush with an external face of the casing 40, and/or with an external face of the stator 32, and/or with an external face of the first portion 61 of the transmission member 60. Thus, an external face of the assembly constituted by the synchronous motor 30, the cycloidal reducer 50, and the casing 40 can be substantially flat.

Figure 4:
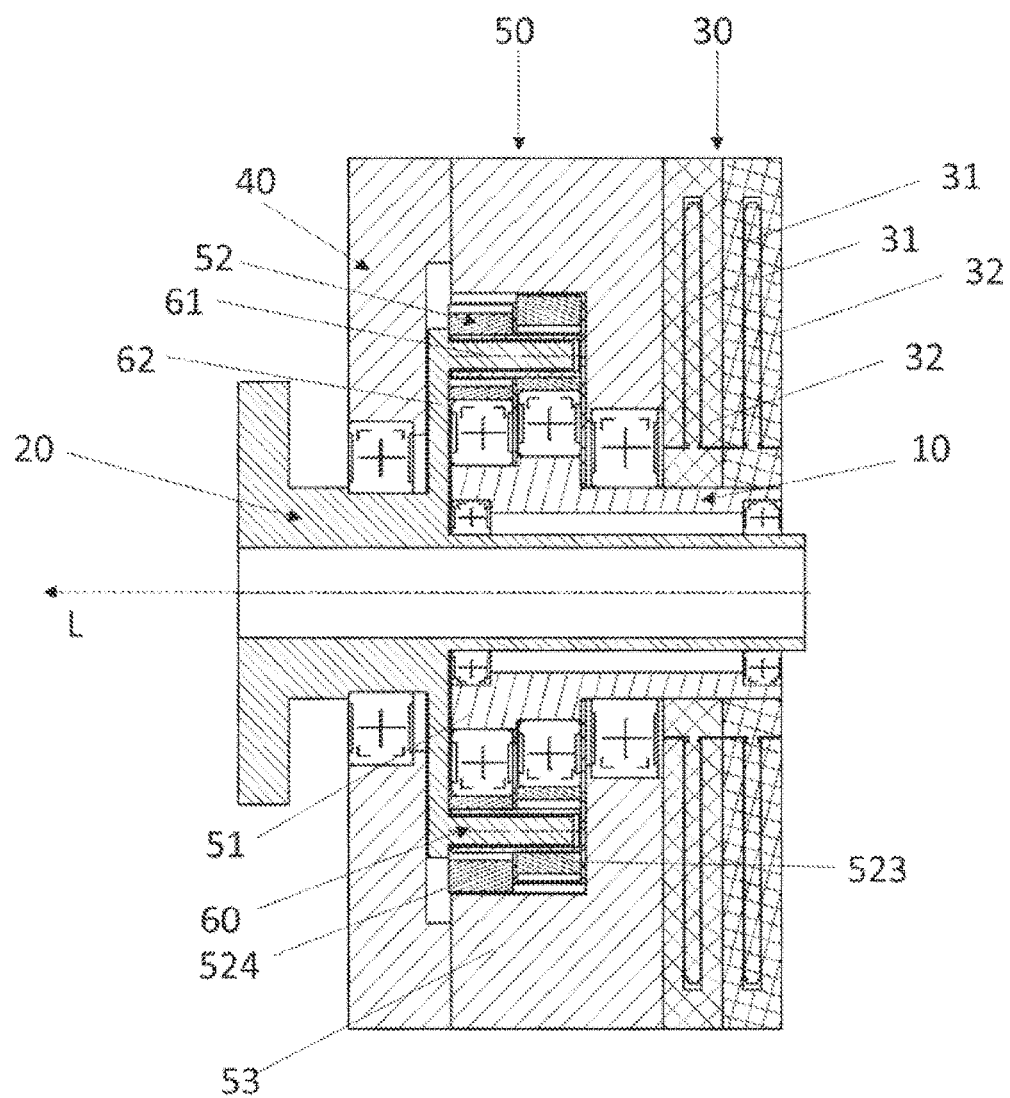
FIG. 4 shows a diagrammatical side view of a winding/unwinding device according to an embodiment of the invention.
Figure 5A:
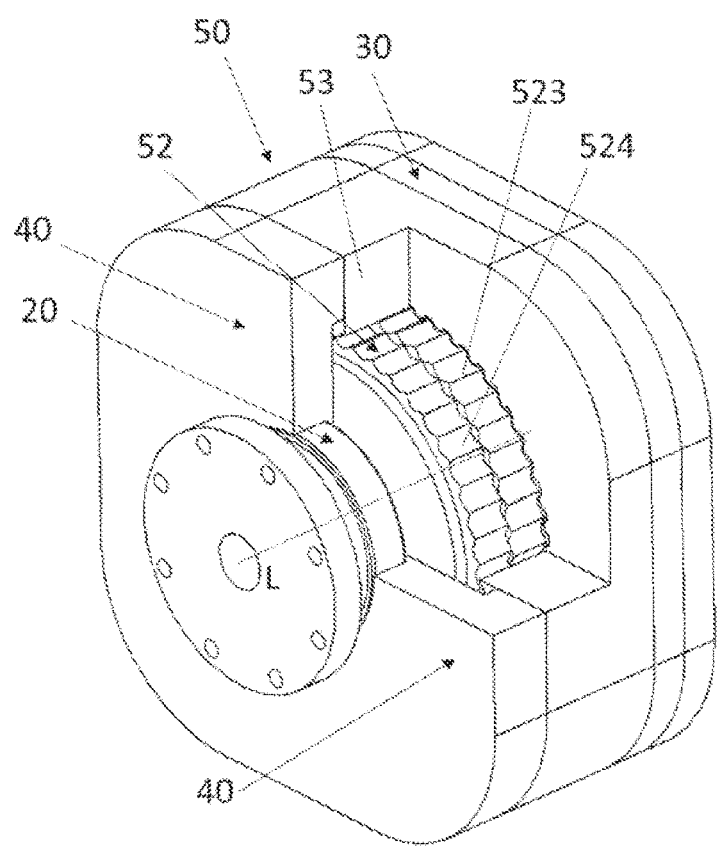
FIGS. 5a and 5b show diagrammatical perspective views as a partial cross-section of a winding/unwinding device according to an embodiment of the invention.
Figure 5B:
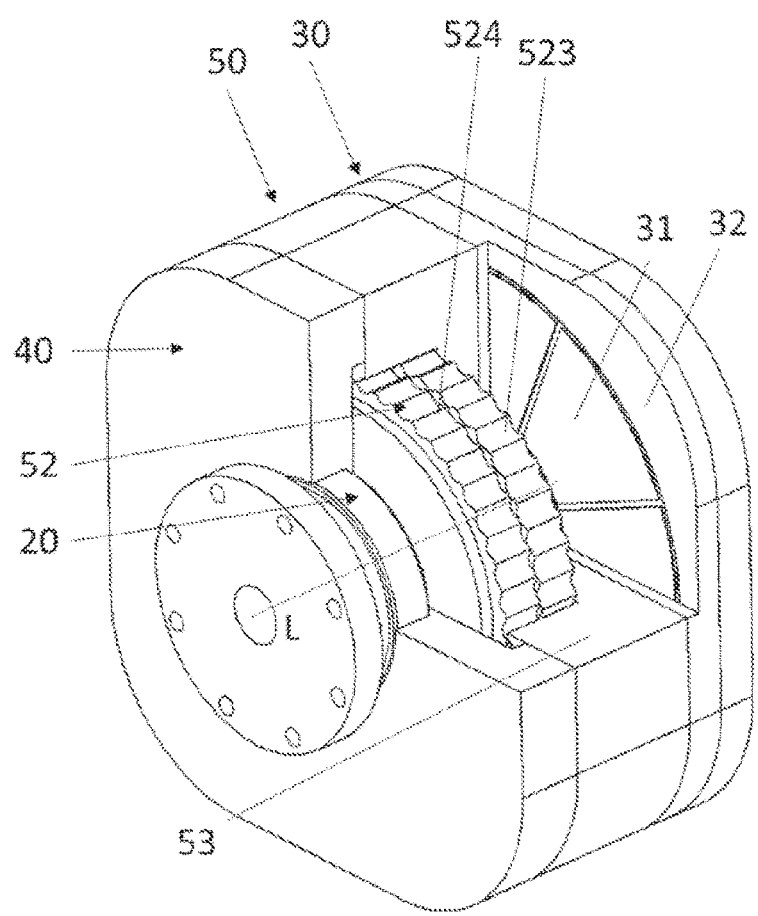

In a first embodiment, shown by way of a non-limiting example in FIGS. 4, 5a and 5b, the cycloidal reducer 50 has a single-stage architecture, or single-train architecture.

The at least one cycloidal disc 52 then comprises at least one longitudinal bore. The first portion 61 of the transmission member 60 forms at least one longitudinal finger suitable for extending in the at least one longitudinal bore of the at least one cycloidal disc 52, in such a way as to transmit the angular displacement of the at least one cycloidal disc 52 to the first portion 61 of the transmission member 60.

This first embodiment has the advantage of requiring only a single cycloidal disc 52 profile to convert the eccentric movement of the cycloidal disc 52 into a circular movement of the first portion 61 of the transmission member 60. Thus, a single cycloidal wheel is to be sized for a cycloidal reducer 50.

The longitudinal finger extends longitudinally, protruding from the second radial portion 62 of the transmission member 60. The longitudinal finger can be substantially cylindrical.

The longitudinal bore can extend through the cycloidal disc 52, or alternatively not be through, the longitudinal bore then extending only in a downstream portion of the cycloidal disc 52.

The longitudinal bore can be substantially cylindrical, and have dimensions greater than those of the longitudinal finger. Thus, during the rotation of the cycloidal disc 52, the longitudinal bore of the cycloidal disc 52 rotates both around the longitudinal finger and about the longitudinal axis L, in such a way as to drive the longitudinal finger in rotation about the longitudinal axis L. In other terms, the dimension of the longitudinal bore of the at least one cycloidal disc 52 makes it possible to absorb the radial movement component of the cycloidal disc 52 which results in the eccentric rotation of the cycloidal disc 52, while still transmitting the rotation component about the longitudinal axis L.

More particularly, the cycloidal disc 52 can comprise a plurality of longitudinal bores circumferentially distributed about the longitudinal axis L, and the first portion 61 of the transmission member 60 forms a plurality of longitudinal fingers circumferentially distributed about the longitudinal axis L. Each longitudinal finger is adapted to extend in a corresponding bore of the cycloidal disc 52. Thus, the mechanical resistance of the assembly is improved, the cycloidal reducer 50 can withstand more substantial impacts and pressures, and the reduction ratio can be increased.

In a first embodiment, the cycloidal reducer 50 can include one or several cycloidal discs 52 mounted in series along the second portion of the output shaft 20. For example, such as shown in FIGS. 4, 5a and 5b, the cycloidal reducer 50 can include two substantially identical cycloidal discs 523, 524 and mounted in series along the longitudinal axis L, in particular along the second portion of the output shaft 20.

The two cycloidal discs 523, 524 are placed in opposite eccentricity in the cycloidal reducer 50. In other terms, the two cycloidal discs 523, 524 are placed substantially in phase opposition angularly, in such a way that a bottom of a cycloidal tooth of a first cycloidal disc 523 is offset in relation to a bottom of cycloidal tooth of a second cycloidal disc 524, and vice-versa. The position of the eccentricity of the second cycloidal disc 524 can be substantially 180° from the position of the eccentricity of the first cycloidal disc 523.

Such a configuration with two cycloidal discs 523, 524 disposed with opposite eccentricities makes it possible, by rotating the two cycloidal wheels in opposition with one another, to balance the imbalance. Moreover, this configuration makes it possible to distribute the contact pressures on the different elements, and to limit the contact pressure on each tooth of the cycloidal discs 523, 524, with the pressure being distributed over a number of teeth that is proportional to the number of cycloidal discs. Moreover, by advantageously choosing the reduction ratios, in particular with odd reduction ratios, the two cycloidal discs 523, 524 are identical. Consequently, the same parts are manufactured twice. Thus, gains in production costs can be made. Moreover, this solution is hardly limited in small reductions, for example below 20.

On the other hand, the reversibility of this architecture is limited, because the resuming of the eccentric movement of the cycloidal discs 523, 524 in opposite eccentricity in order to bring it back to a circular movement generates friction at fingers that takes the eccentric movement by rolling in bores of a larger diameter. Therefore, the reversibility depends greatly on the quality of the contact of these fingers.

The two cycloidal discs 523, 524 can be identical and mesh with a common crown 53, and/or be mounted integral in rotation with a common cam 51. When the wheels of the cycloidal discs 523, 524 each have n teeth and the crown 53 has n+1 teeth, the reduction ratio is then directly equal to the number of teeth of the wheels of the cycloidal discs 523, 524.

Alternatively, each one of the two cycloidal discs 523, 524 can be mounted on a respective fixed crown 53, the two crowns 53 being disposed in series along the longitudinal axis L. Alternatively or furthermore, each one of the two cycloidal discs 523, 524 can be mounted integral in rotation with a respective cam 51, the two cams 51 being disposed in series along the longitudinal axis L.

Each cycloidal disc 523, 524 comprises at least one longitudinal bore. The longitudinal bores of the two cycloidal discs 523, 524 are arranged facing one another in such a way as to form at least one pair of longitudinal bores when the cycloidal discs 523, 524 are mounted in the winding/unwinding device. The at least one finger of the transmission member 60 extends in the at least one pair of longitudinal bores of the two cycloidal discs 523, 524.

When the two cycloidal discs 523, 524 comprise a plurality of longitudinal bores circumferentially distributed about the longitudinal axis L, the longitudinal bores form a plurality of pairs of longitudinal bores circumferentially distributed about the longitudinal axis L. Each finger of the plurality of longitudinal fingers of the first portion 61 of the transmission member 60 extends in a corresponding pair of longitudinal bores.

The two cycloidal discs 523, 524 are integral with one another, in such a way that they have identical rotation speeds about the longitudinal axis L.

In a first embodiment, the cycloidal reducer 50 can comprise more than two cycloidal discs 52 mounted in series along the second portion of the output shaft 20. A larger number of cycloidal discs 52 makes it possible to limit the contact pressure on each tooth of the cycloidal discs 52, with the pressure being distributed over a number of teeth that is proportional to the number of cycloidal discs.

In a second embodiment, shown by way of a non-limiting example in FIGS. 1, 2a and 2b, and 3, the cycloidal reducer 50 comprises a two-stage architecture, or two-train architecture. The cycloidal reducer 50 then comprises two cycloidal discs 521, 522 with different profiles, mounted in series along the longitudinal axis L.

The cycloidal reducer 50 comprises a first cycloidal disc 521 and a second cycloidal disc 522. The first cycloidal disc 521 is mounted integral in rotation with the at least one cam 51. The second cycloidal disc 522 is mounted integral in rotation with the first cycloidal disc 521.

The first portion 61 of the transmission member 60 can include an internal toothing arranged outside the second cycloidal disc 522 and adapted to cooperate with an external cycloidal toothing of the second cycloidal disc 522 in such a way that an eccentric rotation of the second cycloidal disc 522 drives a rotation about the longitudinal axis L of the first portion 61 of the transmission member 60.

The first cycloidal disc 521 meshes with the internal toothing of the fixed crown 53, in a way that is similar to that described hereinabove in reference to the at least one cycloidal disc 52 of the cycloidal reducer 50. If the first cycloidal disc 521 has n teeth, the crown 53 can advantageously have n+1 teeth.

The eccentric rotation of the first cycloidal disc 521 drives a corresponding eccentric rotation of the second cycloidal disc 522. The second cycloidal disc 522 meshes with the internal toothing of the first portion 61 of the transmission member 60. The internal toothing of the first portion 61 of the transmission member 60 cooperates with the external cycloidal toothing of the second cycloidal disc 522 in such a way as to transmit the angular displacement of the second cycloidal disc 522 to the first portion 61 of the transmission member 60. The movement is thus taken by the first portion 61 of the transmission member 60 on the outside of the second cycloidal disc 522, in order to be transmitted to the output shaft 20 of the winding/unwinding device. The first portion 61 of the transmission member 60 is guided in rotation by the bias of the output shaft 20, and is thus constrained to be angularly offset in rotation about the longitudinal axis L.

This second embodiment has the advantage of not requiring fingers to convert the eccentric movement of the cycloid into a circular movement. Thus, the reversibility of the assembly is improved.

The first portion 61 of the transmission member 60 can be a wheel that has a symmetry of revolution about the longitudinal axis L. The first portion 61 of the transmission member 60 comprises an internal toothing whereon the external cycloidal toothing of the second cycloidal disc 522 meshes. A geometry of the first portion 61 of the transmission member 60 can be similar to a geometry of the crown 53.

The internal toothing of the first portion 61 of the transmission member 60 can include rounded teeth, with each tooth comprising a bottom, a flank and a top. The bottom of a tooth correspond to the most external portion of the tooth, and the top of the tooth correspond to the most internal portion of the tooth. The flank of the tooth connects the bottom of the tooth to the top of the tooth. The teeth of the first portion 61 of the transmission member 60 can be circumferentially distributed about the longitudinal axis L, i.e. they are disposed at an equal angular distance from one another.

Each tooth of the internal toothing of the first portion 61 of the transmission member 60 can have a substantially cylindrical profile. A generatrix of the cylinder of revolution extends substantially along the longitudinal axis L, with the cylinders forming the teeth being substantially radially distributed about the longitudinal axis L. Alternatively, each tooth of the internal toothing of the first portion 61 of the transmission member 60 can have any shape adapted to cooperate with the teeth of the cycloidal toothing of the second cycloidal disc 522. For example, the teeth of the first portion 61 of the transmission member 60 can be of a substantially toroidal shape, in order to improve the contact with the cycloidal toothing of the second cycloidal disc 522. The contact is thus made at the centre of the tooth, and extends from the centre of the tooth during the life of the gearbox.

The first portion 61 of the transmission member 60 can have a number of teeth that corresponds to a number of teeth of the second cycloidal disc 522 plus one tooth. Such an offset of a single dent allows for a larger reduction ratio. Thus, if the second cycloidal disc 522 has N teeth, the first portion 61 of the transmission member 60 has N+1 teeth.

At the contact zone between the second cycloidal disc 522 and the first portion 61 of the transmission member 60, a top or a flank of the tooth of the second cycloidal disc 522 is in contact with at least one flank of a tooth of the first portion 61 of the transmission member 60. Several dents of the second cycloidal disc 522 and/or of the first portion 61 of the transmission member 60 can be in contact at the same time. The rotation of the second cycloidal disc 522 in the first portion 61 of the transmission member 60 pushes in reaction, through the bias of the tooth-to-tooth contact, the first portion 61 of the transmission member 60, having it thus rotate about the longitudinal axis L.

In a first embodiment, the first portion 61 of the transmission member 60 comprises a rigid frame and an assembly of shafts. The rigid frame comprises an assembly of bores circumferentially distributed about the longitudinal axis L. Each shaft of the assembly of shafts is inserted into a respective bore of the assembly of bores of the frame of the first portion 61 of the transmission member 60, in such a way as to form the toothing of the first portion 61 of the transmission member 60. This configuration of a rigid frame and of an assembly of independent shafts rigidly assembled in the frame makes it possible to access high reduction ratios. Each shaft of the assembly of shafts can be substantially cylindrical and each bore of the frame of the first portion 61 of the transmission member 60 can be substantially cylindrical, in such a way as to lead to teeth of a substantially cylindrical profile, substantially toroidal, or of any shape adapted to ensure the cooperation with the teeth of the second cycloidal disc 522.

In a second embodiment, the first portion 61 of the transmission member 60 is formed from a single piece and comprises protrusions adapted to form the teeth of the first portion 61 of the transmission member 60. The protrusions can be of a substantially cylindrical, toroidal shape, or of any other shape that makes it possible to access a satisfactory contact with the cycloidal toothing of the second cycloidal disc 522.

The reduction ratio of a two-stage cycloidal reducer 50, of which the first cycloidal disc 521 comprises n teeth, the crown 53 comprises n+1 teeth, the second cycloidal disc 522 comprises N teeth, and the first portion 61 of the transmission member 60 comprises N+1 teeth, can be expressed in the form $$R = \frac{1}{1 - \frac{(n+1)*N}{(N+1)*n}},$$

or $$R = \frac{n*N + n}{n - N}.$$

For example, for N=8 and n=10, the reduction ratio of the cycloidal reducer is R=45.

The winding/unwinding device can be integrated into a link winder. The link winder comprises a reel, a winding/unwinding device such as described hereinabove, a rotating joint, and a control device. The output shaft 20 is arranged for the passage of the link between the reel and the rotating joint, the output shaft 20 being adapted to drive the reel in rotation about the longitudinal axis L.

The control device is adapted to control a setpoint and/or control the synchronous motor or motors 30, in such a way that the control device and the winding/unwinding device provide a suitable winding/unwinding torque.

The winding/unwinding torque is able to change according to a level of winding of the link. Indeed, the winding radius changes according to the quantity of link wound on the reel, for example during the displacement of two elements between which the link is deployed. The control device and the winding/unwinding device can therefore be adapted to provide a winding/unwinding torque adapted according to a level of winding of the link.

Moreover, the winding/unwinding torque is able to change according to an operation phase of the winder. Such a phase can be characterised by parameters such as a speed, an acceleration, an established speed, etc., in the first direction of rotation or in the second direction of rotation. The control device and the winding/unwinding device can therefore be adapted to provide a winding/unwinding torque adapted according to an operating phase of the winder.

Alternatively or furthermore, the control device and the winding/unwinding device can therefore be adapted to provide a predetermined winding/unwinding torque.

Alternatively or furthermore, the control device and the winding/unwinding device can therefore be adapted to provide a winding/unwinding torque regulated according to a measurement of the effect of the winding and/or of the unwinding on the link.

The regulation of the torque is then controlled and carried out in a closed loop.

The invention claimed is:

1. A device for winding or unwinding a link, comprising:
    an input shaft movable in rotation about a longitudinal axis;
    an output shaft substantially coaxial to the input shaft, the output shaft being a hollow through shaft arranged for a passage of the link between a reel and a rotating joint, the output shaft being adapted to drive the reel in rotation about the longitudinal axis;
    at least one permanent magnet synchronous motor comprising a rotor arranged around a first portion of the output shaft, the rotor being integral in rotation with the input shaft;
    a cycloidal reducer arranged around a second portion of the output shaft, the cycloidal reducer comprising at least one internal cam, an external crown and at least one cycloidal disc arranged between each cam and the crown, wherein each cam is mounted integral in rotation with the input shaft, the at least one cycloidal disc is mounted integral in rotation with each cam, and wherein each cam is eccentric, in such a way that a rotation of each cam about the longitudinal axis drives a rotation of the at least one cycloidal disc in an eccentric and cycloidal movement; and
    a transmission member suitable for transmitting an angular displacement of the at least one cycloidal disc to the output shaft, in such a way that an eccentric and cycloidal rotation of the at least one cycloidal disc drives a rotation about the longitudinal axis of the output shaft.

2. The device of claim 1, wherein the input shaft is arranged around at least one portion of the output shaft.

3. The device of claim 1, further comprising a casing wherein the at least one synchronous motor and the cycloidal reducer are arranged, and wherein the output shaft passes through the casing from one end to the other of the casing.

4. The device of claim 1, comprising between one and four synchronous motors mounted in series along the first portion of the output shaft.

5. The device of claim 1, wherein the at least one synchronous motor is an axial flux permanent magnet synchronous motor.

6. The device of claim 1, wherein the at least one cam and the input shaft are formed from a single piece, and wherein each cam comprises an external face having a radial dimension that varies according to the angular position about the longitudinal axis, when each cam is mounted in the winding or unwinding device.

7. The device of claim 1, wherein the transmission member comprises a first portion and a second substantially radial portion adapted to connect the first portion with the output shaft, the transmission member being arranged in such a way that an eccentric and cycloidal rotation of the at least one cycloidal disc drives a rotation about the longitudinal axis of the first portion of the transmission member (60).

8. The device of claim 7, wherein the at least one cycloidal disc comprises at least one longitudinal bore, and wherein the first portion of the transmission member forms at least one longitudinal finger suitable for extending in the at least one longitudinal bore of the at least one cycloidal disc, in such a way as to transmit an angular displacement of the at least one cycloidal disc to the first portion of the transmission member.

9. The device of claim 8, wherein the cycloidal reducer comprises two substantially identical cycloidal discs and mounted in series along the longitudinal axis, the two cycloidal discs being placed in opposite eccentricity in the cycloidal reducer, wherein each cycloidal disc comprises at least one longitudinal bore, the longitudinal bores of the two cycloidal discs being arranged facing one another in such a way as to form at least one pair of longitudinal bores when the cycloidal discs are mounted in the winding/unwinding device, the at least one finger of the transmission member extending in the at least one pair of longitudinal bores of the two cycloidal discs.

10. The device of claim 7, wherein the cycloidal reducer comprises a first cycloidal disc and a second cycloidal disc, the first cycloidal disc being mounted integral in rotation with the at least one cam, the second cycloidal disc being mounted integral in rotation with the first cycloidal disc, wherein the first portion of the transmission member comprises an internal toothing arranged outside the second cycloidal disc and adapted to cooperate with an external cycloidal toothing of the second cycloidal disc in such a way that an eccentric rotation of the second cycloidal disc drives a rotation about the longitudinal axis of the first portion of the transmission member.

11. The device of claim 10, wherein the first portion of the transmission member comprises a rigid frame and an assembly of substantially cylindrical shafts, the rigid frame comprising an assembly of substantially cylindrical bores circumferentially distributed about the longitudinal axis, wherein each shaft of the assembly of shafts is inserted into a respective bore of the assembly of bores of the frame of the first portion of the transmission member, in such a way as to form the internal toothing of the first portion of the transmission member.

12. A winder of a link, the winder comprising:
    a reel;
    a winding or unwinding device including:
        an input shaft movable in rotation about a longitudinal axis,
        an output shaft substantially coaxial to the input shaft, the output shaft being a hollow through shaft arranged for the passage of the link between a reel and a rotating joint, the output shaft being adapted to drive the reel in rotation about the longitudinal axis,
        at least one permanent magnet synchronous motor comprising a rotor arranged around a first portion of the output shaft, the rotor being integral in rotation with the input shaft, a cycloidal reducer arranged around a second portion of the output shaft, the cycloidal reducer comprising at least one internal cam, an external crown and at least one cycloidal disc arranged between each cam and the crown, wherein each cam is mounted integral in rotation with the input shaft, the at least one cycloidal disc is mounted integral in rotation with each cam, and wherein each cam is eccentric, in such a way that a rotation of each cam about the longitudinal axis drives a rotation of the at least one cycloidal disc in an eccentric and cycloidal movement, and a transmission member suitable for transmitting an angular displacement of the at least one cycloidal disc to the output shaft, in such a way that an eccentric and cycloidal rotation of the at least one cycloidal disc drives a rotation about the longitudinal axis of the output shaft;

the rotating joint; and a control device, wherein the control device is adapted to control the synchronous motor, in such a way that the control device and the winding or unwinding device provide a suitable winding or unwinding torque.

\* \* \* \* \*